(12) United States Patent
Letscher et al.

(10) Patent No.: US 11,186,326 B2
(45) Date of Patent: Nov. 30, 2021

(54) BALLASTING DEVICE AND AGRICULTURAL VEHICLE

(71) Applicant: DEERE & COMPANY, Moline, IL (US)

(72) Inventors: Jens Letscher, Albessen (DE); Thorben Riemer, Gundersheim (DE)

(73) Assignee: DEERE & COMPANY, Moline, IL (US)

( * ) Notice: Subject to any disclaimer, the term of this patent is extended or adjusted under 35 U.S.C. 154(b) by 124 days.

(21) Appl. No.: 16/593,524

(22) Filed: Oct. 4, 2019

(65) Prior Publication Data
US 2020/0114989 A1 Apr. 16, 2020

(30) Foreign Application Priority Data

Oct. 10, 2018 (DE) .......................... 102018217286.2

(51) Int. Cl.
*B62D 49/08* (2006.01)
*B62D 49/06* (2006.01)

(52) U.S. Cl.
CPC ....... *B62D 49/085* (2013.01); *B62D 49/0628* (2013.01)

(58) Field of Classification Search
CPC ... E02F 9/18; B62D 49/0621; B62D 49/0628; B62D 49/085; A01B 59/064; A01B 59/066; A01B 59/069
USPC ........................................ 280/757, 758, 759
See application file for complete search history.

(56) References Cited

U.S. PATENT DOCUMENTS

| 2,693,250 | A | | 11/1954 | Barrett | |
|---|---|---|---|---|---|
| 2,891,681 | A | * | 6/1959 | Greivell | B62D 49/085 212/196 |
| 4,659,102 | A | * | 4/1987 | Stuhrmann | B62D 49/085 280/481 |
| 5,131,802 | A | * | 7/1992 | Sunami | E02F 9/18 414/719 |

(Continued)

FOREIGN PATENT DOCUMENTS

| DE | 102005040954 A1 | * 12/2006 | ........... B62D 49/085 |
|---|---|---|---|
| DE | 102016009013 A1 | 2/2018 | |

(Continued)

OTHER PUBLICATIONS

European Search Report issued in counterpart European Patent Application No. 19197281.9 dated Feb. 10, 2020 (5 pages).

(Continued)

*Primary Examiner* — Keith J Frisby (57) ABSTRACT

A ballasting device for an agricultural vehicle includes a ballasting body, a first ballasting arm, and a second ballasting arm. The first ballasting arm is pivotally mounted on the ballasting body about a first bearing axis on one end and a first ballasting weight is arranged at the other end thereof. The second ballasting arm is pivotally mounted on the ballasting body about a second bearing axis at one end and a second ballasting weight is arranged at the other end thereof. The ballasting device includes a receiving device for receiving the ballasting device via a three-point hitch device of the agricultural vehicle. The first ballasting weight is adjustable by the first ballasting arm and the second ballasting weight is adjustable by the second ballasting arm.

19 Claims, 8 Drawing Sheets

(56) References Cited

U.S. PATENT DOCUMENTS

| | | | | |
|---|---|---|---|---|
| 6,227,304 | B1* | 5/2001 | Schlegel | A61P 35/00 |
| | | | | 172/439 |
| 7,971,906 | B2* | 7/2011 | Defrancq | B62D 49/04 |
| | | | | 280/759 |
| 8,201,849 | B2 | 6/2012 | Bauer et al. | |
| 8,662,460 | B2* | 3/2014 | Heimbuch | B62D 49/085 |
| | | | | 248/205.1 |
| 10,066,365 | B2* | 9/2018 | Cartechini | B66C 23/74 |
| 2020/0247487 | A1* | 8/2020 | Dini | B62D 49/0628 |

FOREIGN PATENT DOCUMENTS

| | | | | |
|---|---|---|---|---|
| DE | 102018123245 A1 * | 3/2020 | | B62D 49/085 |
| EP | 315595 A2 * | 5/1989 | | |
| EP | 2186713 A2 | 5/2010 | | |
| FR | 2815319 A1 * | 4/2002 | | B62D 49/085 |
| FR | 2815319 A1 | 4/2002 | | |
| WO | 2010071380 A2 | 6/2010 | | |

OTHER PUBLICATIONS

Tractor Bumper, retrieved from <URL: https://tractorbumper.com/en/> in Aug. 2021, 3 pages.
Bumper, retrieved from <URL: https://lestagri.fr/en/products-bumper.php> in Aug. 2021, 11 pages.
9 new machines launched at the Royal Highland, retrieved from <URL: https://www.fwi.co.uk/machinery/9-new-machines-launched-royal-highland>, dated Jun. 27, 2016, 9 pages.
Massimiliano Varani, Michele Mattetti, Mirko Maraldi, and Giovanni Molari, Mechanical Devices for Mass Distribution Adjustment: Are They Really Convenient?, retrieved from https://www.mdpi.com/2073-4395/10/11/1820/pdf, dated Nov. 20, 2020, 18 pages.
ALI Srl—Sandro Dini, Counterweight Multipliers, retrieved from http://www.zavorra.com/pdf/ALI_SrI_COUNTERWEIGHTS_CATALOG_en.pdf on Aug. 12, 2021, 2 pages.
Zuidberg, retrieved from https://www.zuidberg.com/media/4488/eng-override-protection-overrijdbeveiling-a4-brochure-2-luiks.pdf in Aug. 2021, 2 pages.
Zuidberg, retrieved from https://www.zuidberg.com/en-us/agricultural/accessories/ in Aug. 2021, 14 pages.

* cited by examiner

BALLASTING DEVICE AND AGRICULTURAL VEHICLE

RELATED APPLICATIONS

This application claims priority to German Patent Application Ser. No. 102018217286.2, filed Oct. 10, 2018, the disclosure of which is hereby incorporated by reference in its entirety.

FIELD OF THE DISCLOSURE

The present disclosure relates to a ballasting device for an agricultural vehicle.

BACKGROUND

It is known that agricultural vehicles, for example, tow trucks or tractors or tractor units, when working with attachment devices such as heavy rear attachment devices including a plough are ballasted for balance purposes. In other words, the vehicles are provided with a ballasting device or a ballasting weight at the front end of the vehicle. The ballasting devices or ballasting weights are usually arranged and fixedly installed at a predefined position at the front or rear part of the vehicle body. This is often linked to considerable expenditure and it is not possible to mount or dismount the ballasting devices or ballasting weights without complex equipment (forklift truck, crane, hoist etc.). Furthermore, the known ballasting devices or ballasting weights only provide few or expensive possibilities to vary the ballasting or the additional load applied to the front axle as a result of a ballasting or to adapt to the changing circumstances or working conditions. This often results in practice in work being carried out mostly with the same ballasting weight and, as a result, in the agricultural vehicle not being optimally ballasted when out and about. This can additionally involve further disadvantages, for example, a higher fuel consumption or a higher risk potential in road traffic.

Previous efforts include solutions made to eliminate the problems by, for example, a ballasting being adapted by means of a ballasting weight to the required and prevailing working conditions to the effect that the arrangement of the ballasting weight on the vehicle is variable and in particular a displacement of the ballasting weight in the longitudinal direction of the vehicle is made possible. EP 2 186 713 A2 discloses an adjustable ballasting device on an agricultural vehicle, the ballasting device being receivable by the lower links of a three-point hitch device. Pivot means, which the ballasting device is pivotable about a pivot axis and is adjustable in the longitudinal direction of the vehicle, are additionally provided. The ballasting weight, in this connection, is movable in a received state of the ballasting device between a position close to the vehicle and a position remote from the vehicle with reference to a distance between the center of gravity of the ballasting device and the vehicle. However, the solutions disclosed in the prior art, in particular the ballasting device disclosed in EP 2 186 713 A2, also comprise the disadvantages which have already been named.

Thus, there is a need for a ballasting device and an agricultural vehicle of which the center of gravity of the ballasting device is able to be modified or adapted to the changing working conditions or the risk potential in road traffic is reduced or is of a simple structural design.

SUMMARY

In the present disclosure, a ballasting device for an agricultural vehicle having a ballasting body and a first ballasting arm and a second ballasting arm is proposed according to the disclosure. The first ballasting arm is mounted on the ballasting body so as to be pivotable about a first bearing axis by way of the one end and a first ballasting weight is arranged, in particular loosely connected or fastened, at the other end of the first ballasting arm. The second ballasting arm is mounted on the ballasting body so as to be pivotable about a second bearing axis also by way of the one end and a second ballasting weight is arranged, in particular loosely connected or fastened, at the other end thereof. In addition, the ballasting device, in particular the ballasting body, comprises a receiving device for receiving the ballasting device by means of a three-point hitch device of the agricultural vehicle. The first ballasting weight is adjustable in a manner settable or pivotable by the first ballasting arm, and the second ballasting weight is adjustable in a manner settable or pivotable by means of the second ballasting arm. In particular, the first and second ballasting arms and consequently the first and second ballasting weights are pivotable in relation to one another or, in other words, the first and second ballasting weights are pivotable in relation to one another by means of the first and second ballasting arms. Therefore, a position of the first and second ballasting weights relative to one another or with reference to the ballasting body can be adjustable in a manner settable or pivotable in relation to one another by the first or second ballasting arms.

The first or second ballasting arms can be elongated, in particular, that is to comprise an extent substantially along the respective longitudinal axis of the first or second ballasting arm. In addition, the geometry or the design of the first and second ballasting arm can be identical. The first ballasting arm is mounted on the ballasting body so as to be pivotable about the first bearing axis by way of the one end, for example, a first end, and can therefore be articulated with the one end on the ballasting body. The second ballasting arm is mounted on the ballasting body so as to be pivotable about the second bearing axis by way of the one end, for example, a first end, and can therefore also be articulated with the one end on the ballasting body. The first ballasting weight and the second ballasting weight are arranged at the respective other end, for example, a respective second end of the first ballasting arm and of the second ballasting arm.

The ballasting device can be received at the receiving device of the three-point hitch device. The receiving device can comprise for this purpose one, two or multiple receiving elements, for example, receiving bolts, or a receiving unit. The receiving element can be received by a lower link of the three-point hitch device or can be couplable to the three-point hitch device so as to be pivotable, in particular the receiving element can be aligned coaxially to a pivot axis. The receiving unit can also be received by an upper link of the three-point hitch device or can be couplable to the upper link, in particular can be couplable to the upper link so as to be pivotable. The receiving unit can be a baffle, in particular a triangular baffle which comprises two oppositely situated baffle sides. Consequently, the upper link can extend between the two baffle halves and, for example, be articulated to the halves by means of a bolt or pin.

The receiving device, in particular the receiving element or the receiving unit, can be connected releasably to the ballasting body or fastened on the ballasting body or form part of the ballasting body. The ballasting body and the receiving device, in particular the receiving element or the receiving unit, can be in one piece. In particular, the receiving device can include two receiving elements which can be two receiving bolts arranged laterally (laterally in the sense of transversely to a vehicle longitudinal axis) on the ballasting body, and which are receivable by two lower links of the three-point hitch device or are couplable to the three-point hitch device so as to be pivotable. The pivot axis, in this case, is defined by the two lateral receiving bolts which are held by the lower links of the three-point hitch device. The receiving bolts can be aligned coaxially to the common pivot axis.

The three-point hitch device can be, in particular, a three-point power lift which can be, for example, a rear linkage on the rear side of the agricultural vehicle or as front linkage on the front of the agricultural vehicle. The ballasting device can be received by the lower links and the upper link, in particular a length-invariable upper link, of the three-point hitch device or can be mountable on or couplable to the articulation points of the lower links or of the upper link so as to be pivotable. The upper link, however, can also be a length-adjustable upper link, in particular in such a manner that pivoting of the ballasting device, in particular about the pivot axis, is achievable as a result of a change in the length of the upper link.

It is essential to the disclosure that the first ballasting weight is adjustable, in a manner settable or pivotable, by the first ballasting arm and the second ballasting weight is adjustable, in a manner settable or pivotable by means of the second ballasting arm in such a manner that the center of gravity of the ballasting device, in particular a position of the center of gravity or a distance between the center of gravity of the ballasting device with reference to the ballasting body, is adjustable or settable. In particular, the first and second ballasting weights can be pivotable in relation to one another by the first and second ballasting arms in such a manner that the center of gravity of the ballasting device, in particular a position of the center of gravity or a distance between the center of gravity of the ballasting device with reference to the ballasting body, is adjustable or settable. The adjusting or the pivoting movement of the first or second ballasting arm can be effected, in this connection, manually, for example, by means of manpower, or in an automated manner. In other words, the first and second ballasting arms can be adjustable, in a manner settable or pivotable, in a manner pivotable in relation to one another, from an open position, in which the center of gravity of the ballasting device is at no distance or a minimum distance from the ballasting body, into a closed position in which the center of gravity of the ballasting device is at a maximum distance from the ballasting body, and the other way round.

In the open position, the first and second ballasting arms can be aligned parallel to or coaxially with the pivot axis so that the first and second ballasting weights are arranged diametrically to one another. In the closed position, the first and second ballasting arms can be aligned parallel to one another, in particular orthogonally to the pivot axis. The first and second ballasting weights can therefore be arranged directly adjacent to one another. The first and second ballasting arms can also assume any arbitrary position between the open position and the closed position so that the center of gravity of the ballasting device is adjustable. The first and second ballasting arms can therefore enclose an angle of 180 degrees in the open position and an angle of 0 degree in the closed position, the first ballasting arm being able to cover an angular range of between 0 and 90 degrees with its pivoting movement and the second ballasting arm being able to cover an angular range of between 90 and 180 degrees with its pivoting movement.

In addition, the ballasting device, in a state received by the three-point hitch device, can be movable from a position close to the vehicle with reference to the center of gravity of the ballasting device into a position remote from the vehicle and vice versa. The movement of the ballasting device can be effected by means of lowering or raising the ballasting device with the lower links of the three-point hitch device. As a result, the center of gravity of the ballasting device can be adjusted or set with reference to the vehicle, in particular with reference to a distance between the center of gravity of the ballasting device and the vehicle. Advantageously, it is consequently possible to combine the adjusting or setting of a center of gravity position of the center of gravity of the ballasting device with the adjusting or setting of a center of gravity position of the center of gravity of the ballasting device with reference to the vehicle. In addition, it is possible to introduce a rotational movement of the ballasting device about the pivot axis by means of the raising or lowering of the lower links. As a result, the center of gravity of the ballasting device is able to be displaced at a fixed distance to the pivot axis. It is also possible for the receiving unit of the ballasting device to be realized in such a manner that an upper link, in particular a length-adjustable upper link, of the three-point hitch device is couplable thereto. As a result, with the ballasting device coupled, it is possible to set a rotational movement of the ballasting device about the pivot axis, in particular it is possible by adjusting the length of the upper link to introduce a targeted rotational movement of the ballasting device about the pivot axis.

The ballasting device consequently comprises the following advantages. Purely by the center of gravity of the ballasting device being adjustable or settable, it is possible in an advantageous manner to set or vary a ballasting of the vehicle, that is to say to set or vary in a very precise manner an additional weight that acts on the vehicle. Consequently, the ballasting device is able to be adapted in a simple manner or rapidly to the prevailing operating or working conditions. In addition, in the received state of the ballasting device, it is also possible to adjust or set the position of the center of gravity of the ballasting device with reference to the vehicle. Consequently, the adjusting or setting of a center of gravity position of the center of gravity of the ballasting device with reference to the ballasting device itself is able to be combined with the adjusting or setting of a center of gravity position of the center of gravity of the ballasting device with reference to the vehicle. The ballasting device in combination with the received state of the ballasting device consequently makes it possible for multiple positions of the center of gravity to be able to be combined together in an advantageous manner, as a result of which the additional weight that acts on the vehicle is able to be adjusted in a very precise manner or adapted to the prevailing working or operating conditions.

In a design of the disclosure, the first and second bearing axes are arranged parallel to one another or spatially coinciding with one another. In addition, the first and second bearing axes can be arranged orthogonally to one another. If the first and second bearing axes are arranged spatially coinciding with one another, the first and second ballasting arms can then be mounted on the ballasting body so as to be pivotable about a common rotational axis. In case of the common rotational axis, the first and second ballasting arms can be arranged one after the other or one on top of the other, that is to say sequentially, along the common rotational axis. Advantageously, the ballasting body can thus be designed smaller and the ballasting arms can be designed longer.

If the first and second bearing axes are arranged parallel to one another, the first and second ballasting arms can then be mounted on the ballasting body so as to be pivotable about the first and second bearing axes, that is to say two separate bearing axes, with parallel alignment. Advantageously, the weight of the first and second ballasting weights can thus be distributed better on the ballasting body.

In a design of the present disclosure, the ballasting device includes a first bearing device for the bearing arrangement of the first ballasting arm on the ballasting body or a second bearing device for the bearing arrangement of the second ballasting arm on the ballasting body. By the first bearing device, the first ballasting arm can be mounted on the ballasting body, in particular also articulated on the ballasting body or coupled with the ballasting body, so as to be adjustable (i.e., pivotable) on the first end of the first ballasting arm. The second ballasting arm can also be mounted by means of the second bearing device on the ballasting body, in particular also articulated on the ballasting body or coupled with the ballasting body, so as to be adjustable (i.e., pivotable) on the first end of the second ballasting arm.

However, the first and second bearing devices can also be a common bearing device for the common bearing arrangement of the first and second ballasting arms on the ballasting body, i.e., the first and second ballasting arms can be mounted on the ballasting body, in particular also articulated on the ballasting body or coupled with the ballasting body, so as to be adjustable at their respective first end by the common bearing device. The first bearing device can include a first fastening element or a first holding element and the second bearing device can include a second fastening element or a second holding element. The common bearing device can include a common fastening element or a first and second fastening element and a common holding element or a first and second holding element. The first or the second ballasting arms can comprise at their respective first end a through-bore each. The first or second or common fastening element can be, for example, a pin or a bolt or a screw with a nut. The first or second holding element or the common holding element and the ballasting body can be in one piece or as a component fastened on the ballasting body. If the first and second bearing axes are arranged spatially parallel to one another, the first fastening element can be a first bearing axis and the second fastening element as a second bearing axis. The first ballasting arm can then be mounted on the ballasting body so as to be adjustable by means of the first fastening element such that it can be articulated on the ballasting body by the first fastening element in a manner by the first fastening element being guided through the through-bore of the first ballasting arm and the first holding element or the common holding element and the first fastening element being locked or fastened on the ballasting body.

It is also possible for the second ballasting arm to be mounted on the ballasting body so as to be adjustable by the second fastening element in a manner by the second fastening element being guided through the through-bore of the second ballasting arm and the second holding element or the common holding element and the second fastening element being locked or fastened on the ballasting body. If the first and second bearing axes are arranged so as to coincide spatially with one another, the common fastening element can be realized as the common rotational axis. However, the first and second ballasting arms can then also be mounted so as to be adjustable on the ballasting body by means of the common fastening element or can be articulated on the ballasting body by means of the common fastening element in a manner by the common fastening element being guided through the through-bore of the first and second ballasting arms and the common holding element and the common fastening element being locked or fastened on the ballasting body.

The first or second holding elements can, however, also be realized as a component of the ballasting device that is independent of the ballasting body or of the ballasting arms. The first ballasting arm can be arranged on or in the first holding element and the second ballasting arm can be arranged on or in the second holding element in a manner the ballasting arms can be connected releasably to the respective holding element or fastened to the holding element. The first holding element can be mounted on the ballasting body or can be coupled to the ballasting body so as to be adjustable, in particular pivotable, with the first ballasting arm, which is arranged on or in the first holding element by means of the first fastening element. The second holding element can also be mounted on the ballasting body, or can be coupled to the ballasting body, so as to be adjustable, in particular pivotable, with the second ballasting arm which is arranged on or in the second holding element by the second fastening element. In particular, the first fastening element can be guided through the through-bore of the first ballasting arm or the first holding element. The second fastening element can also be guided through the through-bore of the second ballasting arm or the second holding element. The first or second fastening elements can be locked or connected releasably or fastened to the ballasting body. Adjustability of the first or second ballasting arm and consequently of the center of gravity of the ballasting device is advantageously achieved the described measures.

Operatively connected can be understood below, in particular, as the transmission of force between two components of the ballasting device, for example, from the first to the second holding element or from the first to the second ballasting arm or from the first to the second active element and vice versa. It is possible to synchronize a movement of the two components. As a special measure, the first or the second ballasting arms or the first or second holding elements can be operatively connected to one another. In particular, the first and second ballasting arm or the first and second holding elements can be operatively connected together by means of a connecting element, for example, a lever. The connecting element can be realized and arranged in such a manner that the movement, in particular the pivoting movement, of the first and second holding elements or of the first and second ballasting arms is advantageously synchronized.

In a design of the present disclosure, the first ballasting arm comprises a first active element at its one end, that is to say the first end, and the second ballasting arm comprises a second active element at its one end, that is to say the first end, wherein the first and second active elements are operatively connected together. The first or second active element can be, for example, a toothed wheel or a belt connection. The first ballasting arm and the first active element or the second ballasting arm and the second active element can be realized in one piece, that is to say as one component, or in two pieces, and can be releasably connected together. The first and second active elements can be operatively connected together or arranged in such a manner that the first and second ballasting arms are adjustable (i.e., pivotable) in relation to one another by a movement of the first or second active element. The movement, in particular the pivoting movement, of the first and second ballasting arms is able to be advantageously synchronized as a result.

In a design of the present disclosure, the ballasting device includes a first actuator, with which the first ballasting arm is adjustable, in particular pivotable, about the first bearing axis, or the ballasting device includes a second actuator with which the second ballasting arm is adjustable, in particular pivotable, about the second bearing axis. The first actuator can be operatively connected to the first or second ballasting arm or to the first or second holding element or to the first or second active element or coupled releasably to the same or fastened to the same. The first or second ballasting arm or the first or second holding element or the first or second active element can be actuatable or adjustable in a manner pivotable or movable in relation to one another by means of the first actuator. The first actuator can consequently be advantageously used additionally as a connecting element. In addition, a force, in particular a movement or pivoting movement, of the first actuator is able to be transmitted on account of an existing operative connection from the first ballasting arm or first holding element or connecting element or first active element to the second ballasting arm or the second holding element or the second active element.

The first actuator or second actuator can be designed in such a manner and arranged as described that they are able to move the first and second ballasting arms from the closed position into the open position and vice versa. In addition, the second actuator can be operatively connected to the second ballasting arm or the second holding element or the second active element or coupled with or fastened to the same. The second ballasting arm or the second holding element or the second active element can be actuatable or adjustable, in particular pivotable, by the second actuator, i.e., the second actuator is able to apply a force in such a manner that the second ballasting arm or the first holding element or the first active element are actuatable or adjustable.

It is also possible to transmit a force of the second actuator, the second ballasting arm, the second holding element, the connecting element, or the second active element on account of the operative connection to the first ballasting arm or the first holding element or the first active element. If a first and second actuator are provided, it is also possible to dispense with a coupling such as an operative connection between the ballasting arms or holding elements or active elements. It is possible to dispense with the connecting element. The first or second actuators can be hydraulic cylinders. It is, however, also conceivable for a different, for example electric, mechanical or pneumatic type of actuation to be chosen for a lifting cylinder. It is thus possible to realize the first or second actuators as electric motors, for example, spindle motors. A corresponding arrangement with a cable pull is also conceivable in order to design the actuation in a purely mechanical manner. The first or second actuators are connected releasably to the first end of the respective ballasting arm or to the respective holding element or to the respective active element or are fastened to the same in such a manner that as a result of actuating the first or second actuator of the first or second ballasting arm, a guided pivoting movement of the respective ballasting weight about the first or second bearing axes is able to be triggered. This ensures that an operator is able to realize a varying or displacing or adjusting of the ballasting device by remote control and even in rapidly changing operating conditions is able to react quickly and optimize the ballasting.

The ballasting device or the agricultural vehicle can also include a control unit. The control unit can be designed and set up in such a manner that the first actuator, the first or second ballasting arms or the first ballasting arm or, by the second actuator, the second ballasting arm are adjustable, in relation to one another in such a manner that the center of gravity of the ballasting device is determinable or storable or displayable or settable. A method for adjusting or setting the center of gravity of the ballasting device can also be carried out by way of the control unit.

In one embodiment of the present disclosure, the ballasting device includes one or multiple stop buffers or one or multiple locking devices. One or multiple stop buffers or one or multiple fastening elements can be provided on the ballasting body or on the first or second ballasting arms or on the first or second ballasting weights. In particular, the stop buffer can be realized as part of the ballasting body or of the first or second ballasting arms or of the first or second ballasting weights or can be fastened as a separate stop buffer. The stop buffer can be realized as a limit stop so that the pivoting movement of the first or second ballasting arms is delimited between the open position and the closed position. The stop buffer can, however, also be realized as a damper so that the pivoting movement of the first or second ballasting arms is damped. The stop buffers can be produced from metal or an elastic material, for example, iron or rubber. The stop buffer makes it possible advantageously to restrict the pivoting movement of the ballasting arms or to absorb kinetic energy of the ballasting arms.

By means of the locking device, the ballasting arms can be locked in the open or closed positions or in the other settable positions in between them. Advantageously, the locking devices make it possible for the first or second ballasting arms not to be able to carry out any pivoting movement. The locking device can include, for example, a first or second locking element such as a pin or a bolt or a screw. In this connection, the first or second ballasting arms can be locked precisely in the open position or the closed position by the first or second locking element being releasably connected to the ballasting body and the respective ballasting arms so that a pivoting movement of the ballasting arms is blocked. The locking device can, however, also include one or multiple hooks or locking bars which lock the first or second ballasting arms precisely in the open position or the closed position by, for example, the hook or locking bar being fastened to the ballasting body and being moved with a counter piece, for example, an eyelet, on the respective ballasting arm into a positive locking and re-releasable connection so that a pivoting movement of the ballasting arms is suppressed. The hooks or locking bars can include springs in order to hold them in the ballasting arms.

The locking device can be a bonnet closure or snap-type closure. It is additionally possible to provide a locking device with which the lower or upper links of the three-point hitch device are locked in the settable positions. This ensures that the ballasting device is held securely and in a play-free manner is a position close to the vehicle or also in a position remote from the vehicle. In this connection, it is also possible to provide positions in a lockable manner between the position which is close to the vehicle or the position remote from the vehicle so that ballasting is able to be carried out in a correspondingly finely tuned manner. The locking device includes the first or second ballasting arms or the locking device, the adjustable lower links or the adjustable upper link being lockable, that is to say can be held or blocked in a certain position hydraulically, pneumatically, mechanically or electrically, so that the first or second ballasting arms or the adjustable lower or upper links spend time in a held or blocked position.

In particular, the first or second actuators can be realized as a locking device by the first or second actuators being lockable, that is to say can be held or blocked, hydraulically, pneumatically, mechanically or electrically in a certain position so that they spend time in a held or blocked position. Such a locking or blocking action can be carried out, for example, in a hydraulic manner on the ballasting device that includes a hydraulically realized first or second actuator. An electrically actuatable spindle or step motor as first or second actuator can remain in its position as a result of corresponding electronic control signals and block the ballasting arms electrically. This ensures that the ballasting device is held securely and play-free in the open or closed positions or in a position in between these so that ballasting is able to be carried out in a correspondingly fine-tuned manner. The three-point hitch device or the vehicle can also include one or more actuators such as hydraulical actuators for the adjustable lower or upper links. The one or more actuators can also be an electrically actuatable spindle or step motor and can remain in its position, for example, as a result of corresponding electronic control signals and block the link arrangement electrically.

In an embodiment of the disclosure, the first or second ballasting arms is a telescopic ballasting arms such as telescopic length-adjustable ballasting arms. To this end, the first or second ballasting arms can be in two pieces, that is to say each comprise two releasable arm elements. The arm elements can be guided so as to be adjustable relative to one another and together, in particular the one arm element can be guided in the other arm element. The two arm elements can be adjustable manually or automatically, for example, by means of a feed device. In addition, one or multiple locking devices can be provided for delimiting the relative movement of the arm elements with respect to one another. For example, the arm elements can comprise holes in which, for example, a pin or bolt through the holes in both arm elements blocks the relative movement of the two arm elements with respect to one another. Advantageously, the respective length of the first or second ballasting arms can be adjusted and set with the measure. Furthermore, as a result, the center of gravity position of the center of gravity of the ballasting device is additionally adjustable or settable.

In a further design of this disclosure, the first ballasting weight or the second ballasting weight include one or multiple individual weights (e.g., at 40, 50 or 60 kg each). In this case, the first ballasting weight can be releasably connected to the first ballasting arm or the second ballasting weight can be releasably connected to the second ballasting arm. Advantageously, the ballasting of the ballasting device, in particular the first or second ballasting weight, is thus able to be adjusted (i.e., raised or lowered) in a simple manner. The first or second ballasting weights can, however, also be a one-part weight (e.g., 800-1000 kg, in particular 900 kg). The first ballasting arm can also be realized in one piece with the first ballasting weight as one component, or the second ballasting arm can be realized in one piece with the second ballasting weight.

In another design of the disclosure, the agricultural vehicle includes a three-point hitch device, wherein the ballasting device with a ballasting body and a first and second ballasting arm is receivable or received by the three-point hitch device. This facilitates both the putting down or dismounting and also the placing in position or mounting of the ballasting device. In addition, the first ballasting arm is mounted on the ballasting body by the one end so as to be pivotable about a first bearing axis and a first ballasting weight is arranged at the other end thereof. The second ballasting arm is also mounted on the ballasting body by way of the one end so as to be pivotable about a second bearing axis and a second ballasting weight is arranged at the other end thereof.

The agricultural vehicle can additionally comprise a vehicle body or vehicle frame to which the three-point hitch device is fastened on the vehicle body or vehicle frame. The ballasting device, in particular a ballasting body of the ballasting device, comprises a receiving device for receiving the ballasting device by the three-point hitch device. The receiving device can be received by one or multiple lower links or upper links of the three-point hitch device. The first and second ballasting weights can be adjusted, in particular pivoted in relation to one another, by the first and second ballasting arms in such a manner that the center of gravity of the ballasting device is adjustable or settable, in particular a position of the center of gravity of the ballasting device is able to be adjusted or set with reference to the ballasting body. At the same time, the center of gravity of the ballasting device can be adjusted or set with reference to the vehicle by the ballasting device being adjustable or settable by the three-point hitch device from a position close to the vehicle into a position remote from the vehicle and the other way round. Advantageously, it is consequently possible to combine the adjusting or setting of a center of gravity position of the center of gravity of the ballasting device, in particular with reference to the ballasting device itself, with the adjusting or setting of a center of gravity position of the center of gravity of the ballasting device with reference to the vehicle.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
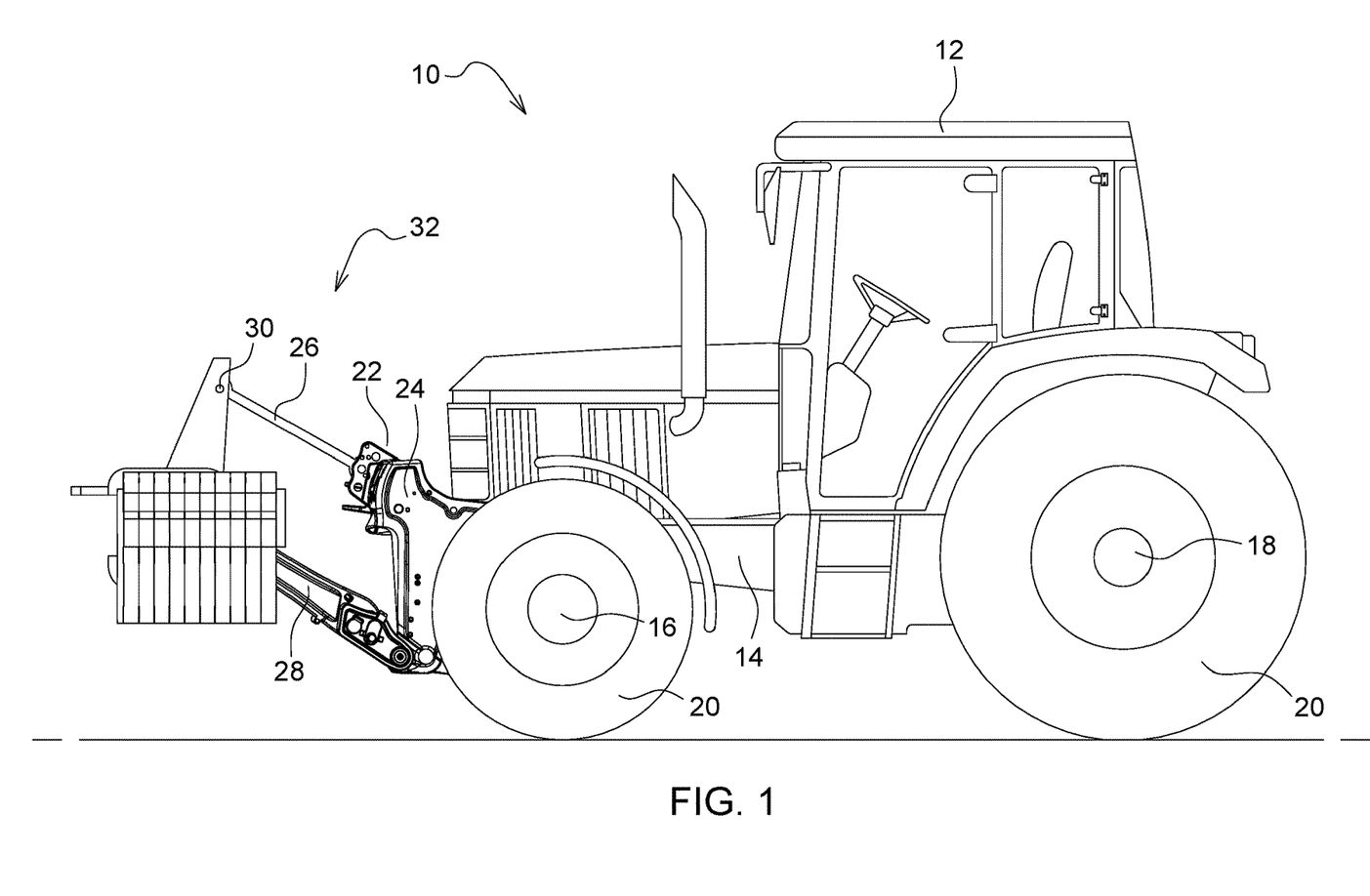
FIG. 1 shows a schematic side view of an agricultural vehicle having a ballasting device which is coupled to a three-point hitch device.

FIG. 1 shows a schematic side view of an embodiment of an agricultural vehicle 10 according to the present disclosure in the form of a tractor 12 having a ballasting device 32 coupled to a three-point hitch device 22. The tractor 12 comprises a vehicle frame 14 which is carried by wheels 20 suspended on a front axle 16 and a rear axle 18. A three-point hitch device 22, which is fastened releasably to the vehicle frame 14 via a fastening frame 24 such as by being screw-connected thereto, is arranged on the vehicle frame 14 on the front side of the vehicle 10 and extends forward beyond the vehicle frame 14. The front three-point hitch device 22 comprises an upper link 26, which is arranged centrally with respect to the vehicle 10 and in the upper region of the three-point hitch device 22, and two lower links 28, which are arranged laterally to the upper link 26 and in the lower region of the three-point hitch device 22 and are each mounted on the fastening frame 24 so as to be pivotable. Actuating means or device (not shown), which hold the lower links 28 in a desired pivoting position with respect to the fastening frame 22, extend in each case between the lower links 28 and the fastening frame 22. The actuating means or device can be a hydraulic cylinder so that the lower links 28 are hydraulically height-adjustable or angularly adjustable or pivotable. The upper and lower links 26, 28 are each provided with articulation points 30 or arrester hooks, to which an operating device in the form of a ballasting device 32, which is designed for the three-point hitch device 22, is coupled or attached.

Various embodiments of a ballasting device 32 according to the present disclosure are described below by way of FIGS. 2 to 14. The ballasting devices 32 described below each comprise a ballasting body 34 and a first ballasting arm 36 and a second ballasting arm 40. The first ballasting arm 36, in this connection, is mounted on the ballasting body 34 such that it is articulated on the ballasting body 34 by way of the one end so as to be pivotable about a first bearing axis 44, and a first ballasting weight 38 is arranged on the other end thereof. The second ballasting arm 40 is also mounted on the ballasting body 34 such that it is also articulated on the ballasting body 34 by way of the one end so as to be pivotable about a second bearing axis 46, and a second ballasting weight 42 is arranged on the other end thereof. The ballasting device 32, in particular the ballasting body 34, further comprises a receiving device 48 for receiving the ballasting device 32 by a three-point hitch device 22 of the agricultural vehicle 10.

Essential to the ballasting device 32 according to the present disclosure is that by the first ballasting arm 36 the first ballasting weight 38 and by the second ballasting arm 40 the second ballasting weight 42 are adjustable, e.g., are pivotable in relation to one another, in such a manner that the center of gravity S of the ballasting device 32 with reference to the ballasting body 34 is adjustable or settable. The first and second ballasting arms 36, 40 can be adjustable or settable, in this connection, manually, for example, by manpower or in an automated manner via a first or second actuator.

In other words, the first and second ballasting arms 36, 40 are adjustable or pivotable in relation to one another from an open position, in which the center of gravity S of the ballasting device 32 is at no distance or a minimum distance from the ballasting body 34, into a closed position in which the center of gravity S of the ballasting device 32 is at a maximum distance from the ballasting body 34. The first and second ballasting arms 36, 40 can also assume any arbitrary position between the open position and the closed position so that the center of gravity S is settable in an arbitrary manner.

The ballasting body 32 makes it possible as a result of the adjusting or pivoting of the first and second ballasting arms 36, 40 in relation to one another to attain a displacement of the first and second ballasting weight 38, 42 so that the center of gravity S of the ballasting device 32 is adjustable or settable by means of the first and second ballasting arms 36, 40. By the center of gravity S of the ballasting device 32 itself being adjustable or settable, with the ballasting device 32, for example, in a received state, the additional weight that acts upon the wheels (front wheels) of the vehicle 10 is able to be set and adapted optimally to the prevailing operating and working conditions.

The receiving device 48 includes one or multiple laterally extending receiving bolts 50, which are realized as receiving bolts 50 and arranged laterally (laterally in the sense of transversely to a vehicle longitudinal axis) on the ballasting body 34. The ballasting body 32 is receivable at the receiving bolts 50 by the lower links 28, in particular the two lower links 28, of the three-point hitch device 22 or is coupled with the three-point hitch device 22 so as to be pivotable. The receiving device 48 additionally comprises a receiving bearing 52 which is receivable by an upper link 26 of the three-point hitch device 22 or is coupled to the three-point hitch device 22 so as to be pivotable.

The ballasting devices 32 shown in FIGS. 1 to 14 are all suitable for receiving the ballasting device 32 by means of a three-point hitch device 22 or are received by the same so that only the differences between the ballasting devices will be discussed below. The receiving device 48 is aligned coaxially to a common pivot axis 56, in particular the receiving bolts 50 are aligned coaxially to the common pivot axis 56. The ballasting device, in a state received by the three-point hitch device 22, is additionally adjustable or settable from a position close to the vehicle with reference to the center of gravity S of the ballasting device 32 into a position remote from the vehicle and back. The adjusting or setting of the ballasting device 32, in this case, is achievable by moving the three-point hitch device 22, i.e., by lowering or raising the lower links 28. In addition, a rotational movement of the ballasting device 32 about the pivot axis 56 can be introduced as a result of the raising or lowering of the lower links 28. As a result, the center of gravity S of the ballasting device 32 is displaced in a fixed radius to the pivot axis 56 so that the center of gravity S of the ballasting device 32 is additionally displaced.

Figure 2:
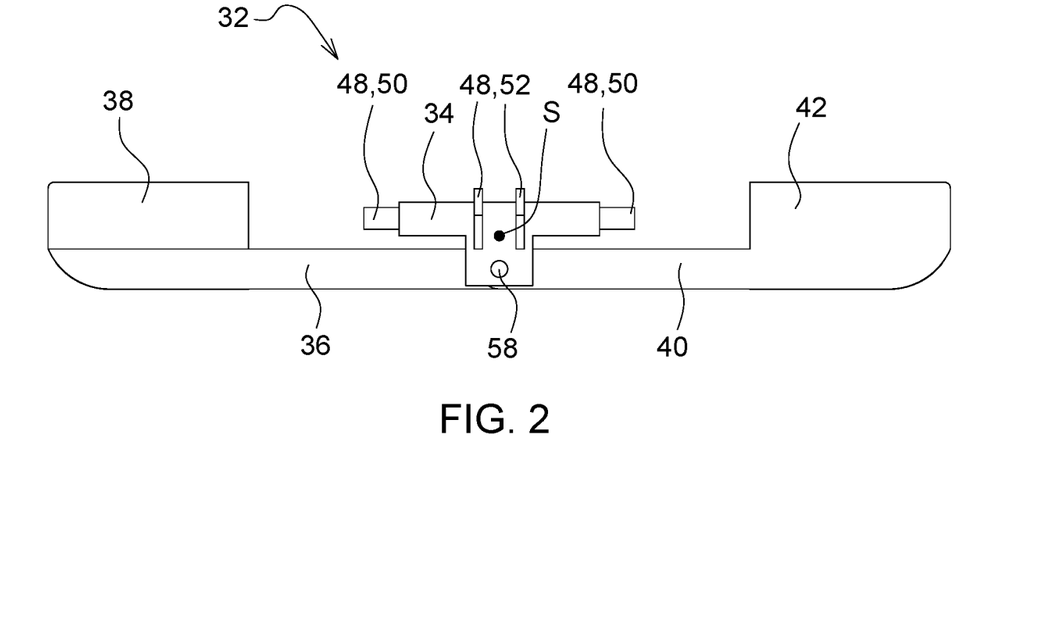
FIG. 2 shows a schematic top view of a first embodiment of a ballasting device in an open position.
Figure 3:
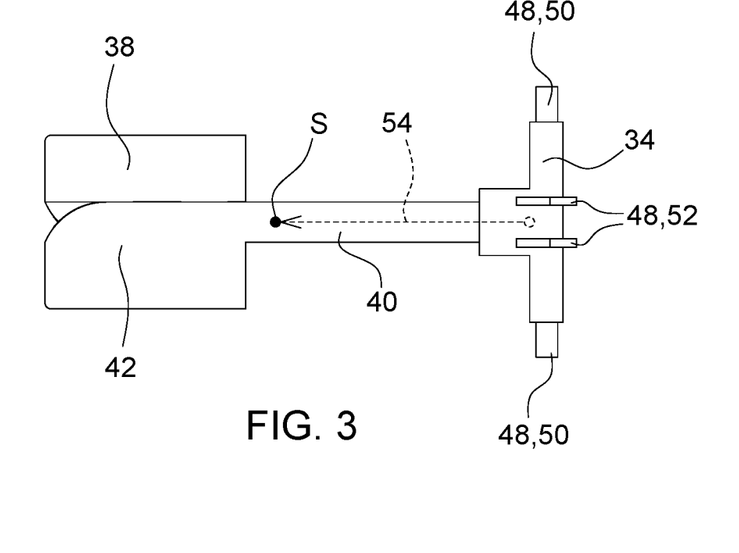
FIG. 3 shows a schematic top view of the first embodiment of the ballasting device according to FIG. 2 in a closed position.

FIGS. 2 and 3 show schematic top views of a first embodiment of a ballasting device 32 in an open position (FIG. 2) and in a closed position (FIG. 3). The ballasting device 32 shown in FIGS. 2 and 3 corresponds substantially to the ballasting device 32 shown in FIG. 1 so that simply the differences are discussed below. In the open position in FIG. 2, it is shown schematically that the center of gravity S is at no distance or a minimum distance from the ballasting body 34. If the first and second ballasting arms 36, 40 are adjusted into the closed position in FIG. 3, in particular pivoted in relation to one another, the center of gravity S of the ballasting device 32 is displaced toward a maximum distance 54 from the ballasting body 34. Furthermore, the first and second bearing axes 44, 46 are arranged so as to coincide with one another spatially, in particular are realized as a common rotational axis 58, so that the first and second ballasting arms 36, 40 are mounted or articulated on the ballasting body 34 so as to be pivotable about the common rotational axis 58. In the event of the common rotational axis 58 (as shown in FIGS. 2 to 5), the first and second ballasting arms 36, 40 are arranged sequentially, i.e., one after another or one on top of another, along the common rotational axis 58. The first ballasting arm 36 and the first ballasting weight 38 as well as the second ballasting arm 40 and the second ballasting weight 42 are shown as one piece.

Figure 4:
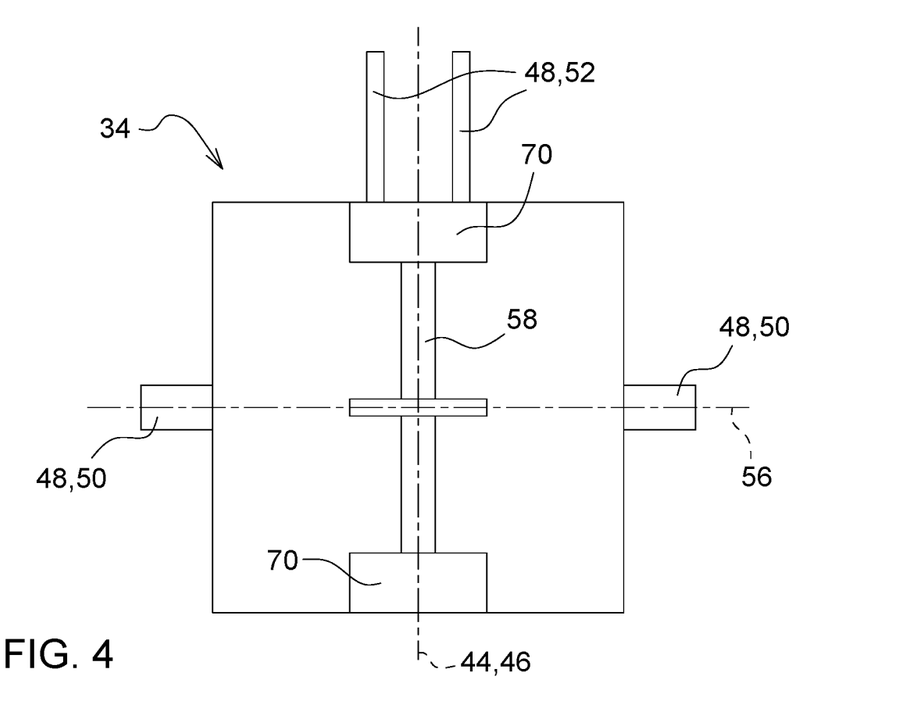
FIG. 4 shows a schematic representation of a ballasting body of the first embodiment of the ballasting device according to FIGS. 2 and 3.
Figure 5:
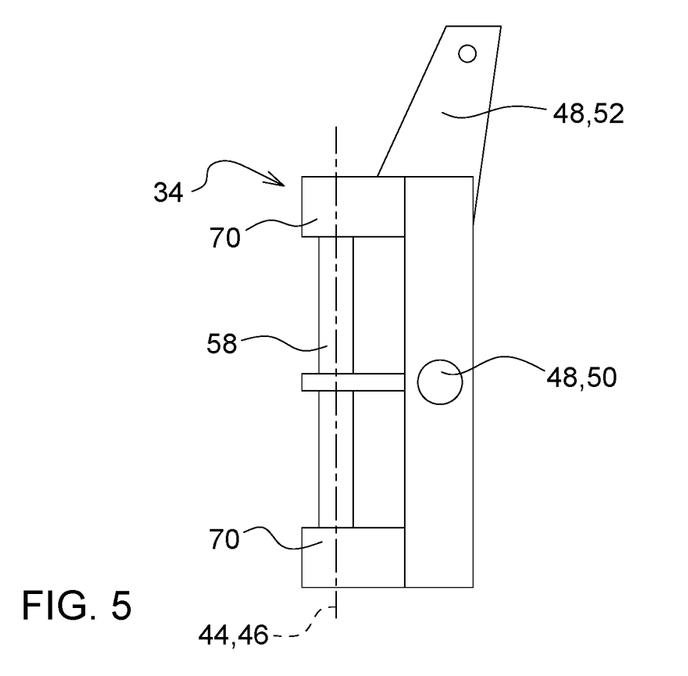
FIG. 5 shows a schematic representation of the ballasting body of the first embodiment of the ballasting device according to FIGS. 2 and 3.

FIGS. 4 and 5 show schematic representations of the ballasting body 34 of the first embodiment of the ballasting device 32 from FIGS. 2 and 3 so that only the differences are discussed below. The ballasting body 34 shown in FIGS. 4 and 5 is the same ballasting body 34. It can be seen in FIGS. 4 and 5 that a common bearing device is provided on the ballasting body 34 for the bearing arrangement of the first and second ballasting arms 36, 40. The common bearing device includes a common fastening element 58, which is also shown as a common rotational axis 58, and a common holding element 70, which is part of the ballasting body 34. The first or second or common fastening element 58 can be, for example, a pin or a bolt or a screw with a nut. The common holding element 70 and the ballasting body 34 are one piece, i.e., as one common component. It is not shown that the first and second ballasting arms 36, 40 comprise at their respective first end, that is to say the end articulated to the ballasting body 34, one though-bore each. The first and second ballasting arms 36, 40 are therefore articulated on the ballasting body 34 by the common fastening element 58. The common fastening element 58 is guided by the two holding elements 70 and locked or fastened to the ballasting body 34. The receiving device 48 with the two receiving bolts 50 and the receiving bearing 52 are realized as part of the ballasting body 34, i.e., the ballasting body 34 and the receiving device 48 are realized in one piece.

Figure 6:
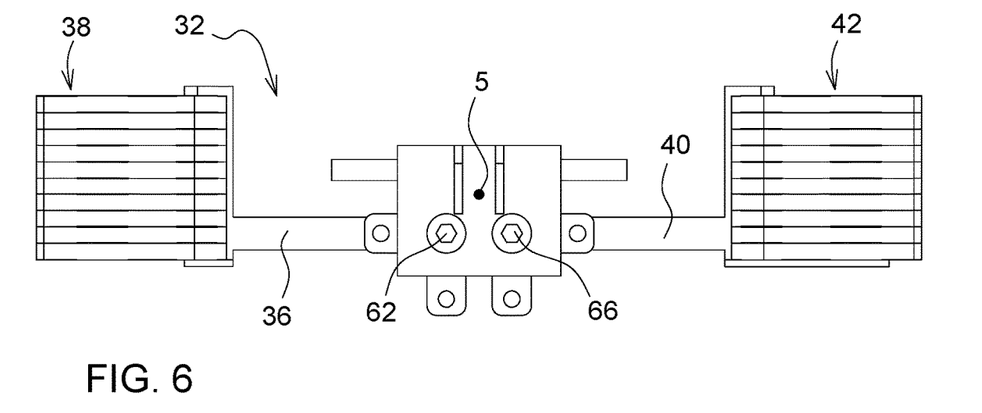
FIG. 6 shows a schematic top view of a second embodiment of a ballasting device in an open position.
Figure 7:
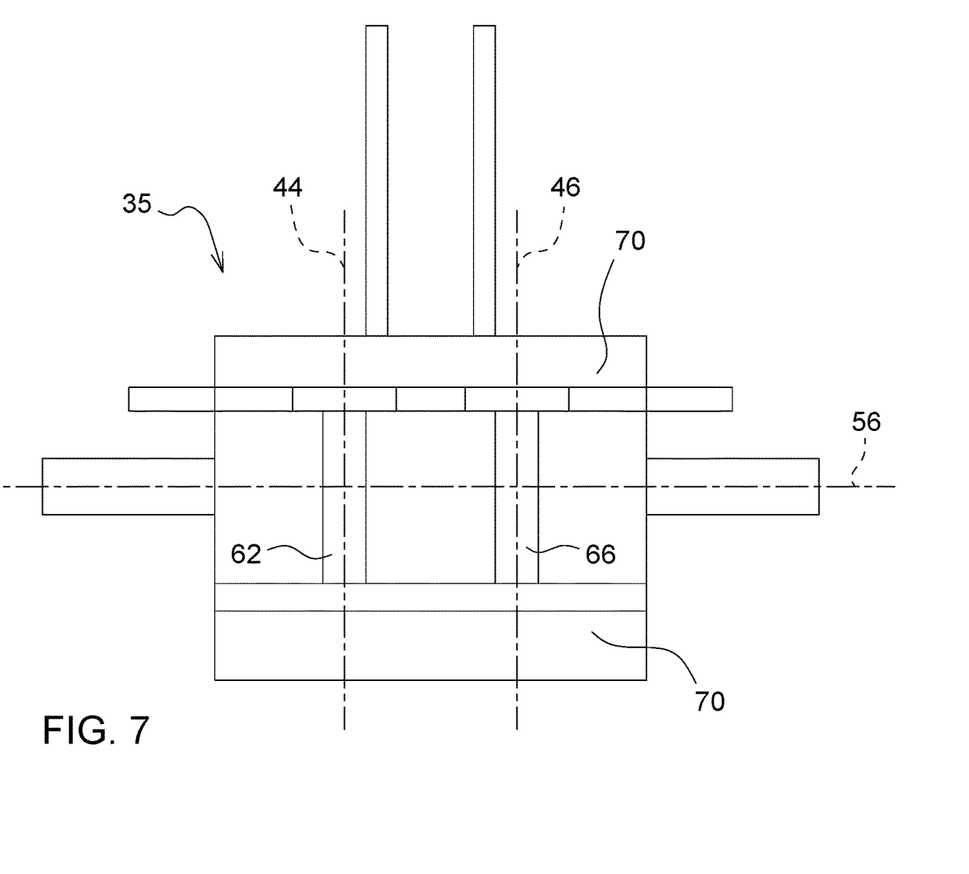
FIG. 7 shows a schematic representation of a ballasting body of the second embodiment of the ballasting device according to FIG. 6.

FIG. 6 shows a schematic top view of a second embodiment of the present disclosure of the ballasting device 32 in an open position and FIG. 7 shows a schematic representation of a ballasting body 34 of the second embodiment of the ballasting device 32. The ballasting device 32 shown in FIG. 6 and the ballasting body shown in FIG. 7 correspond substantially to the ballasting devices 32 or ballasting bodies 34 shown in FIGS. 1 to 5 so that only the differences are discussed below. A substantial difference is that the first and second bearing axes 44, 46 are arranged parallel to one another. In addition, the first and second bearing axes 44, 46 are arranged orthogonally to the pivot axis 56. The ballasting device 32 according to the second embodiment includes a common bearing device for the bearing arrangement of the first ballasting arm and second ballasting arm. By means of the common bearing device, which includes a first and second fastening element 62, 66 and a common holding element 70, the first ballasting arm 36 is mounted and articulated on the ballasting body 34 at the first end of the first ballasting arm 36 so as to be pivotable and the second ballasting arm 40 is mounted and articulated on the ballasting body 34 at the first end of the second ballasting arm 40 so as to be pivotable. The first and second ballasting arms 36, 40 are additionally pivotable with respect to one another in relation to one another.

The first and second fastening elements 62, 66, for example, a pin or bolt or a screw with a nut, are designed at the same time as first and second bearing axes 44, 46. The first and second bearing axes 44, 46 and consequently the first and second fastening elements 62, 66 are arranged spatially parallel to one another. The common holding element 70 is part of the ballasting body 34, i.e., the two components are one piece as one common component. It cannot be seen that the first and second ballasting arms 36, 40 at their respective first end, that is to say the end articulated to the ballasting body 34, comprise one throughbore each. The first and second ballasting arms 36, 40 are therefore articulated to the ballasting body 34 by the first and second fastening elements 62, 66, the first and second fastening elements 62, 66 being guided through the throughbores and the common holding element 70 and locked or fastened on the ballasting body 34.

Figure 8:
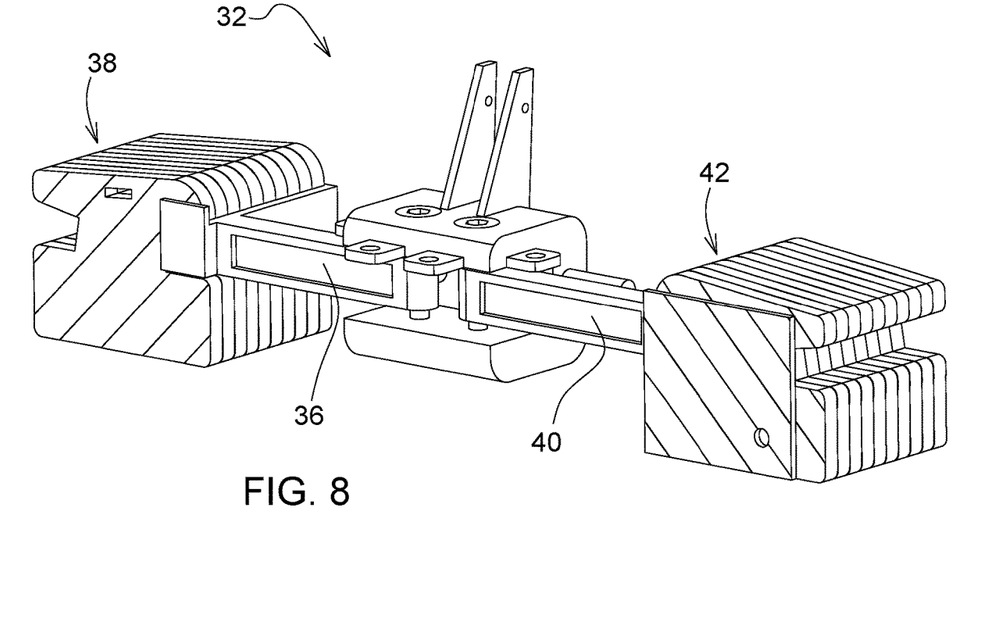
FIG. 8 shows a schematic representation in perspective of a third embodiment of the ballasting device in an open position.

FIG. 8 shows a schematic representation in perspective of a third embodiment according to the disclosure of the ballasting device 32 in an open position, which corresponds substantially to the ballasting devices 32 shown in FIGS. 1 to 7, simply the differences being discussed below. The first and second ballasting weights 38, 42 include multiple individual weights which are releasably connected to the first and second ballasting arms 36, 40 or are fastened or locked to the same. The individual weights can be suspended simply in the respective ballasting arm. As a result, a higher degree of flexibility with reference to the ballasting is advantageously able to be achieved.

Figure 9:
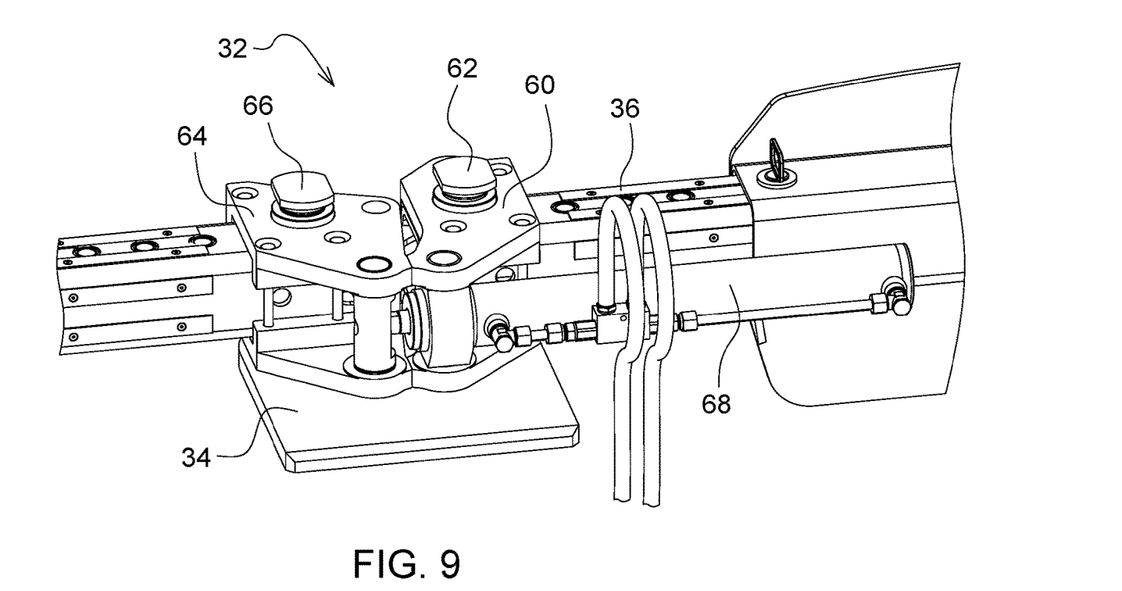
FIG. 9 shows a schematic representation in perspective of a fourth embodiment of the ballasting device in an open position.

FIG. 9 shows a schematic representation in perspective of a fourth embodiment according to the disclosure of the ballasting device 32 in an open position, which corresponds substantially to the ballasting devices 32 shown in FIGS. 1 to 8, simply the differences being discussed below. The first ballasting arm 36 is arranged on, in particular in, the first holding element 60 and the second ballasting arm 40 is arranged on, in particular in, the second holding element 64, i.e., connected releasably to the respective holding element. The first ballasting arm 36 and the first holding element 60 are mounted or articulated on the ballasting body 34 so as to be pivotable in relation to one another by the first fastening element 62, which is also a first bearing axis 44, and the second ballasting arm 40 and the second holding element 64 are mounted or articulated on the ballasting body 34 so as to be pivotable in relation to one another by the second fastening element 66 which is also a second bearing axis 46. The ballasting device 32 additionally includes a first actuator 68, which is arranged on the first holding element 60, i.e., fastened on the same or connected releasably to the same so as to be rotatable or connected to the same or releasable and rotatable.

The first actuator 68 is a lifting cylinder with piston or piston rod. The first actuator 68 or lifting cylinder is fastened with its cylinder rotatably on the first holding element and the piston rod of which is fastened rotatably on the second holding element 64, as a result of which the first and second holding elements 60, 64 are operatively connected by the actuator. The first holding element 60 and consequently also the first ballasting arm 36 are pivotable by means of an actuation of the first actuator 68. In addition, when the first actuator 68 is actuated on account of the operative connection, a force is also transmitted to the second holding element 64 and the second ballasting arm 40 is consequently also pivoted. The first and second ballasting arms 36, 40 are therefore pivotable in relation to one another, the movement of the first and second holding elements 60, 64 and consequently of the first and second ballasting arms 36, 40 running in a synchronous manner. The first actuator 68 is arranged on the first and second holding elements 60, 64 for this purpose in such a manner that the ballasting device 32, with the piston or the piston rod extended fully out of the cylinder, is in the closed position and with the piston or the piston rod fully retracted is in the open position.

Figure 10:
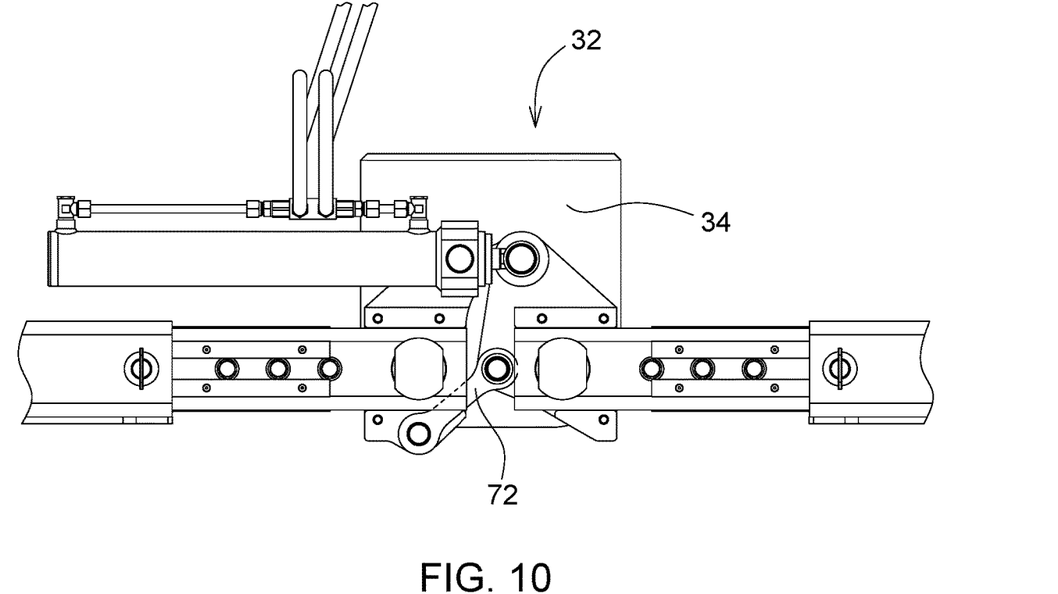
FIG. 10 shows a schematic representation of a fifth embodiment of the ballasting device.

FIG. 10 shows a schematic representation of a fifth embodiment according to the present disclosure of the ballasting device 32 in an open position. The ballasting device 32 in FIG. 10 corresponds substantially to the ballasting devices 32 shown in FIGS. 1 to 9, simply the differences being discussed below. FIG. 10 shows the first and second holding elements 60, 64 which are operatively connected by a connecting element 72 such as a lever, so that a movement of the first and second holding elements 60, 64 and consequently of the first and second ballasting arms 36, 40 runs in a synchronous manner.

Figure 11:
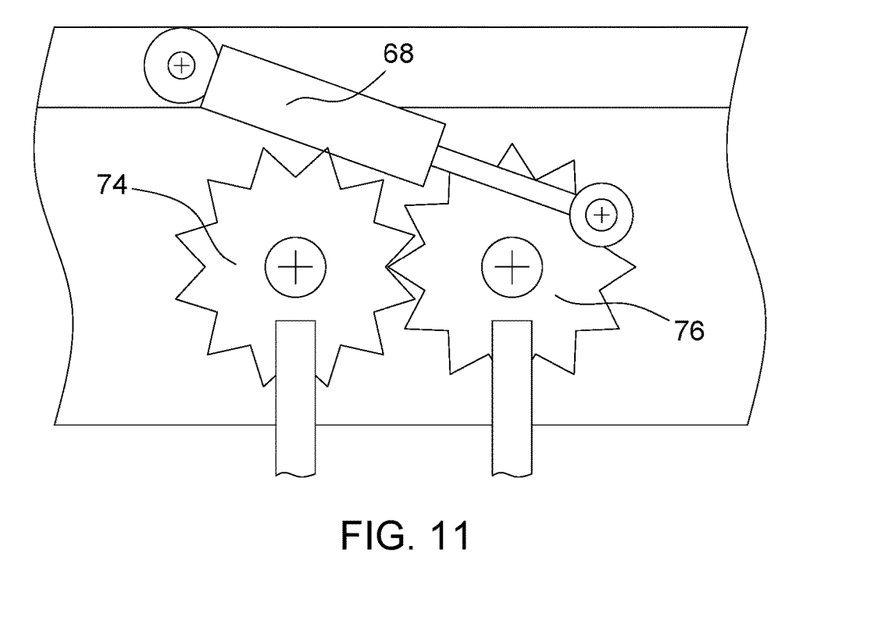
FIG. 11 shows a schematic representation of a sixth embodiment of the ballasting device.

FIG. 11 shows a schematic representation of a sixth embodiment of the ballasting device 32 in an open position. The ballasting device 32 in FIG. 11 corresponds substantially to the ballasting devices 32 shown in FIGS. 1 to 10. FIG. 11 shows a first ballasting arm 36, which includes, at the articulated end, a first active element 74, which is a toothed wheel, and a second ballasting arm 40 which includes at the articulated end a second active element 76, which is a toothed wheel. The first and second active elements 74, 76 are operatively connected as a result of meshing. The second active element 76 can additionally be connected to a second actuator 78 in such a manner that when the second actuator is actuated, the first and second ballasting arms 36, 40 are pivoted in relation to one another on account of the one contrarotating rotation of the first and second active elements 74, 76, and, on account of the operative connection, a movement of the first and second active elements 74, 76 brings about a pivoting movement of the first and second ballasting arms 36, 40. Here, the movement may be in a synchronous manner. The first ballasting arm 36 and the first active element 74 are one piece, i.e., one component. The second ballasting arm 40 and the second active element 76 likewise.

Figure 12:
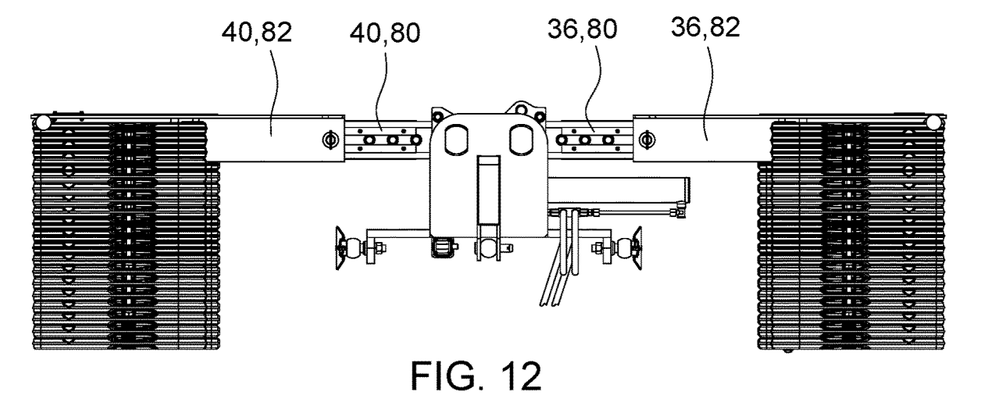
FIG. 12 shows a schematic top view of a seventh embodiment of the ballasting device in an open position.

FIG. 12 shows a schematic top view of a seventh embodiment of the ballasting device 32 in an open position. The ballasting device 32 corresponds substantially to the ballasting devices 32 shown in FIGS. 1 to 11 so that simply the differences are discussed below. The first and second ballasting arms 36, 40 are telescopic, length-adjustable ballasting arms. The first and second ballasting arms 36, 40 are each in two pieces, therefore include in each case two releasable arm elements 80, 82. The arm elements 80, 82 are guided into one another, this means that one arm element 80 is arranged and guided in the other arm element 82 so that the arm elements 80, 82 are adjustable relative to one another. A relative movement of the two arm elements 80, 82 in relation to one another is blocked by, for example, a pin or a bolt being inserted through bores or holes in the two arm elements so that the arm elements 80, 82 are locked.

Figure 13:
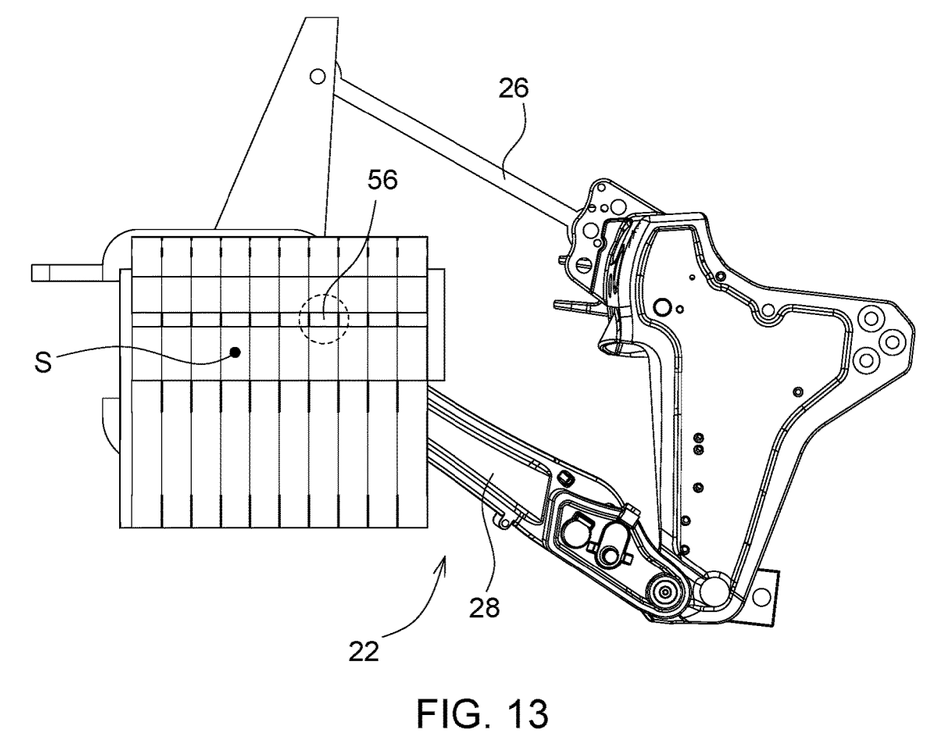
FIG. 13 shows a schematic representation of a ballasting device in a state received by a three-point hitch device in a position close to the vehicle.
Figure 14:
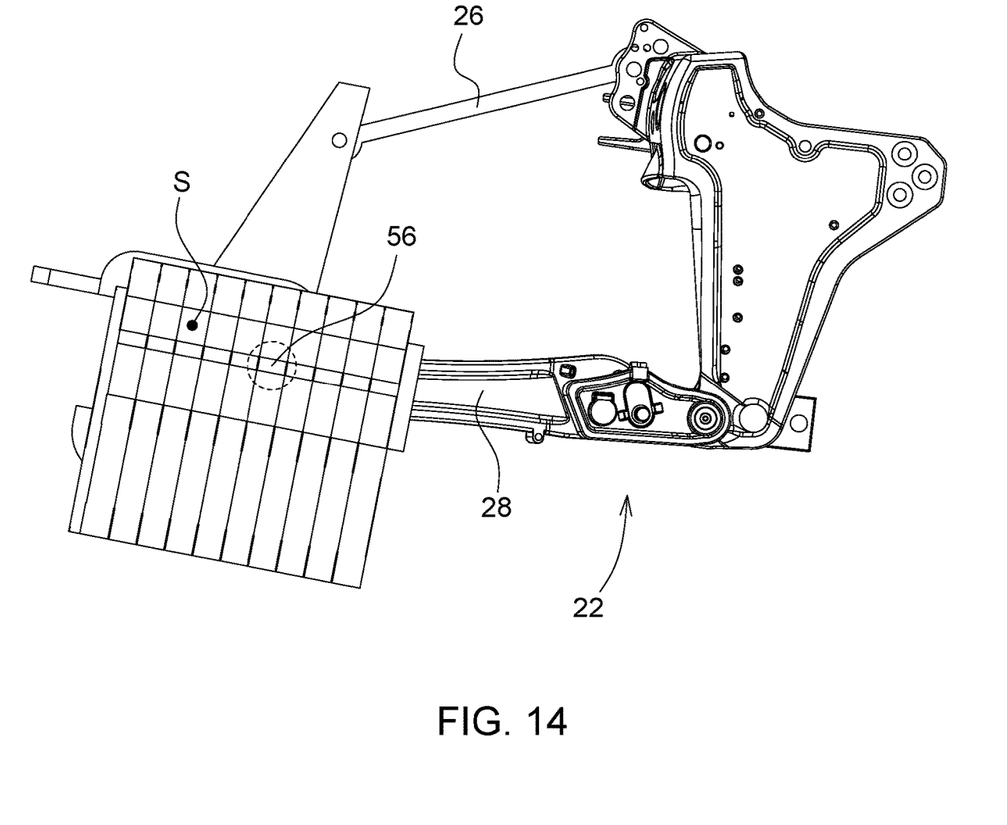
FIG. 14 shows a schematic representation of a ballasting device in a state received by a three-point hitch device in a position remote from the vehicle.

FIGS. 13 and 14 show a schematic representation of a ballasting device 32 according to the present disclosure in a state received by a three-point hitch device 22 in a position close to the vehicle and a position remote from the vehicle. The ballasting device 32 corresponds substantially to the ballasting devices 32 shown in FIGS. 1 to 12 so that simply the differences are discussed below. FIG. 13 shows a ballasting device 32 in an open position in the position close to the vehicle, the center of gravity position of the center of gravity S of the ballasting device 32 being arranged below the pivot axis 56 which is defined by the receiving device 48. FIG. 14 shows a ballasting device 32 in an open position in the position remote from the vehicle, the center of gravity position of the center of gravity S of the ballasting device being arranged above the pivot axis 56 which is defined by the receiving device 48. The ballasting device 32 can be adjusted or set from the position close to the vehicle into the position remote from the vehicle and into all positions in between as a result of lowering or raising the lower links 28 in conjunction with a rigid or length-adjustable upper link 26. The center of gravity S of the ballasting weight 32 assumes a higher position of the center of gravity in the position close to the vehicle than in the position remote from the vehicle. Advantageously, it is possible to combine the setting of the center of gravity S of the ballasting device 32 with the setting of a position of the center of gravity of the ballasting device 32 in a received state of the ballasting device 32 with reference to the vehicle.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A ballasting device for an agricultural vehicle, comprising:
   a ballasting body; and
   a first ballasting arm and a second ballasting arm;
   wherein the first ballasting arm is pivotally mounted on the ballasting body about a first bearing axis on one end and a first ballasting weight is arranged at the other end thereof;
   wherein the second ballasting arm is pivotally mounted on the ballasting body about a second bearing axis at one end and a second ballasting weight is arranged at the other end thereof;
   wherein the first and second ballasting arms have an open position and a closed position;
   wherein in the open position, the first and second ballasting weights are positioned diametrically to each other on either side of the ballasting body, the first and second ballasting arms are coaxial and enclose an angle of 180 degrees, and the center of gravity of the ballasting device is at a minimum distance from the ballasting body;
   wherein in the closed position, the first and second ballasting weights are positioned adjacent to each other in front of the ballasting body, the first and second ballasting arms are parallel and enclose an angle of 0 degrees, and the center of gravity of the ballasting device is at a maximum distance from the ballasting body;
   wherein the first and second ballasting arms have a plurality of positions between the open and closed positions so that the center of gravity of the ballasting device is adjustable between the minimum and maximum distances from the ballasting body; and wherein the ballasting device comprises a receiving device for receiving the ballasting device via a three-point hitch device of the agricultural vehicle, and the first ballasting weight is adjustable by the first ballasting arm and the second ballasting weight is adjustable by the second ballasting arm.

2. The ballasting device according to claim 1, wherein the first and second bearing axes are arranged parallel to one another.

3. The ballasting device according to claim 1, further comprising:
   a first bearing device for a bearing arrangement of the first ballasting arm on the ballasting body; and
   a second bearing device for a bearing arrangement of the second ballasting arm on the ballasting body.

4. The ballasting device according to claim 1, wherein the first bearing device includes a first fastening element or a first holding element.

5. The ballasting device according to claim 4, wherein the second bearing device includes a second fastening element or a second holding element.

6. The ballasting device according to claim 5, wherein the first or second ballasting arm or the first or second holding element are operatively connected together.

7. The ballasting device according to claim 1, wherein the first ballasting arm comprises a first active element at the one end and the second ballasting arm comprises a second active element at the one end.

8. The ballasting device according to claim 7, wherein the first and second active elements are operatively connected together.

9. The ballasting device according to claim 1, further comprising a first actuator for adjustably moving the first ballasting arm about the first bearing axis.

10. The ballasting device according to claim 9, further comprising a second actuator for adjustably moving the second ballasting arm about the second bearing axis.

11. The ballasting device according to claim 1, wherein the first and second ballasting arms comprise telescopic ballasting arms.

12. The ballasting device according to claim 1, wherein the first ballasting weight or the second ballasting weight include a plurality of individual weights.

13. An agricultural vehicle, comprising:
a frame;
a plurality of wheels for supporting the frame; and
a ballasting device comprising:
a ballasting body;
a first ballasting arm and a second ballasting arm;
wherein the first ballasting arm is pivotally mounted on the ballasting body about a first bearing axis on one end and a first ballasting weight is arranged at the other end thereof;
wherein the second ballasting arm is pivotally mounted on the ballasting body about a second bearing axis at one end and a second ballasting weight is arranged at the other end thereof;
wherein the first and second ballasting arms have an open position and a closed position;
wherein in the open position, the first and second ballasting weights are positioned diametrically to each other on either side of the ballasting body, the first and second ballasting arms are coaxial and enclose an angle of 180 degrees, and the center of gravity of the ballasting device is at a minimum distance from the ballasting body;

wherein in the closed position, the first and second ballasting weights are positioned adjacent to each other in front of the ballasting body, the first and second ballasting arms are parallel and enclose an angle of 0 degrees, and the center of gravity of the ballasting device is at a maximum distance from the ballasting body;

wherein the first and second ballasting arms have a plurality of positions between the open and closed positions so that the center of gravity of the ballasting device is adjustable between the minimum and maximum distances from the ballasting body; and wherein the ballasting device comprises a receiving device for receiving the ballasting device via a three-point hitch device of the agricultural vehicle, and the first ballasting weight is adjustable by the first ballasting arm and the second ballasting weight is adjustable by the second ballasting arm.

14. The agricultural vehicle according to claim 13, further comprising a three-point hitch device to which the ballasting device is coupled thereto.

15. The agricultural vehicle according to claim 13, wherein the first and second bearing axes are arranged parallel to one another.

16. The agricultural vehicle according to claim 13, further comprising:
   a first bearing device for a bearing arrangement of the first ballasting arm on the ballasting body; and
   a second bearing device for a bearing arrangement of the second ballasting arm on the ballasting body.

17. The agricultural vehicle according to claim 13, wherein the first ballasting arm comprises a first active element at the one end and the second ballasting arm comprises a second active element at the one end.

18. The agricultural vehicle according to claim 17, wherein the first and second active elements are operatively connected together.

19. A ballasting device for an agricultural vehicle, comprising:
a ballasting body;
a first ballasting arm pivotally mounted on the ballasting body about a first bearing axis on one end and a first ballasting weight arranged at the other end thereof;
a second ballasting arm pivotally mounted on the ballasting body about a second bearing axis at one end and a second ballasting weight arranged at the other end thereof,
a first actuator for adjustably moving the first ballasting arm about the first bearing axis;
a second actuator for adjustably moving the second ballasting arm about the second bearing axis; and
a receiving device for receiving the ballasting device via a three-point hitch device of the agricultural vehicle;
wherein the first ballasting weight is adjustable by the first ballasting arm and the second ballasting weight is adjustable by the second ballasting arm;
wherein the first and second ballasting arms have an open position and a closed position;
wherein in the open position, the first and second ballasting weights are positioned diametrically to each other on either side of the ballasting body, the first and second ballasting arms are coaxial and enclose an angle of 180 degrees, and the center of gravity of the ballasting device is at a minimum distance from the ballasting body;

wherein in the closed position, the first and second ballasting weights are positioned adjacent to each other in front of the ballasting body, the first and second ballasting arms are parallel and enclose an angle of 0 degrees, and the center of gravity of the ballasting device is at a maximum distance from the ballasting body; and wherein the first and second ballasting arms have a plurality of positions between the open and closed positions so that the center of gravity of the ballasting device is adjustable between the minimum and maximum distances from the ballasting body.

* * * * *